(12) United States Patent
Schlanger

(10) Patent No.: US 7,427,112 B2
(45) Date of Patent: Sep. 23, 2008

(54) RIM FOR A SPOKED WHEEL

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 143 days.

(21) Appl. No.: 11/321,295

(22) Filed: Dec. 27, 2005

(65) Prior Publication Data
US 2006/0138855 A1 Jun. 29, 2006

Related U.S. Application Data

(60) Provisional application No. 60/639,471, filed on Dec. 28, 2004.

(51) Int. Cl.
*B60B 25/00* (2006.01)
*B60B 1/02* (2006.01)
(52) U.S. Cl. ..................... 301/95.104; 301/58
(58) Field of Classification Search .............. 301/55, 301/58, 95.101, 95.104, 95.107, 95.108
See application file for complete search history.

(56) References Cited

U.S. PATENT DOCUMENTS

| | | | |
|---|---|---|---|
| 4,583,787 A | 4/1986 | Michelotti | |
| 5,499,864 A * | 3/1996 | Klein et al. | 301/95.104 |
| 5,651,591 A * | 7/1997 | Mercat et al. | 301/95.104 |
| 5,975,646 A | 11/1999 | Campagnolo | |
| 6,402,255 B1 * | 6/2002 | Chen | 301/95.101 |
| 7,063,392 B2 * | 6/2006 | Chen | 301/58 |
| 2001/0005099 A1 * | 6/2001 | Mercat et al. | 301/58 |
| 2003/0001429 A1 * | 1/2003 | Gubesch et al. | 301/58 |

* cited by examiner

*Primary Examiner*—Jason R Bellinger

(57) ABSTRACT

An improved vehicle wheel, including an outer rim, a central hub with a central axle and an outer flange and a plurality of spokes extending between the rim and hub. The spokes have a first portion connected to the rim and a second portion opposed to the first portion and connected to said hub. The outer rim includes a spoke bed wall with a spoke hole therethrough for connection with the first end of the spoke. The spoke bed wall has a radially outboard surface, which is a convex outboard surface including a radially outboard apex and a radially inboard portion relative to the apex and adjacent the apex.

39 Claims, 15 Drawing Sheets

RIM FOR A SPOKED WHEEL

CROSS-REFERENCE TO RELATED APPLICATION

This application claims priority of U.S. provisional patent application 60/639,471, filed Dec. 28, 2004, and entitled "Rim for a Spoked Wheel".

BACKGROUND OF THE INVENTION (1) Field of the Invention

The present invention relates to spoked vehicle wheels and bicycle wheels in particular. More specifically, this invention relates to the spoke bed geometry of the rims of such wheels.

(2) Description of the Related Art

In the development of a tension-spoked wheel, the geometry of interaction between the spoke and the rim is of particular importance as it relates to the strength, stiffness, and longevity of the completed wheel structure. The overlie engagement between the under-head surface of the nipple and the spoke bed of the rim served to provide the requisite bracing to resist the spoke tension forces of the wheel. Heretofore, the spoke bed of the bicycle rim is commonly designed to have either a flat or concave surface in the region where it contacts the under-head portion of the spoke nipple. The under-head geometry or transition portion of the spoke nipple is commonly a tapered conical surface.

It is noted that the spoke does not exit the rim in a perfectly radial direction. Instead, the spoke is directed with an angle of inclination toward one of two (or more) axially spaced hub flanges. Given the geometry just described, close inspection of the interface between the spoke bed and the rim reveals some significant shortcomings that can compromise the strength and stiffness of the wheel.

Firstly, it is shown that, due to this angle of inclination of the spoke, the under-head surface of the spoke nipple contacts the spoke bed at only a single contact point. Such a small contact area, combined with the high spoke tension of modern wheels, creates very high contact stress at this singular contact point. The result is excessive galling between the spoke nipple and the rim as the nipple is rotatably adjusted to bring the spoke up to the desired tension. This provides resistance to rotation of the nipple and thereby makes the nipple more difficult to adjust. In addition, this also causes the nipple and rim to abrade against each other, removing nipple and/or rim material and potentially weakening the structural integrity of one or both of these components.

Secondly, this contact point is offset from the centerline of the spoke. Since the spoke tension acts along the spoke centerline, and the resisting force acts at this contact point, this offset results in a bending moment at the spoke nipple. Since the spoke tension increases and decreases cyclically as the wheel is rotated, this bending moment introduces a bending stress to the spoke, which reduces the fatigue life of the spoke and/or nipple and/or rim. In fact, it is not at all uncommon for a spoke to fail due to fatigue under normal use.

Further, this bending moment tends to deflect the spoke and add a bent region in the spoke adjacent the nipple. The bent region will tend to flex somewhat due to the variations in spoke tension experienced during normal use of the wheel. This flex has the effect of reducing the effective tensile stiffness of the spoke and thus tends to reduce the lateral stiffness of the wheel. The result is a more "wobbly" and less responsive feel on the part of the rider. This bending also serves to increase fatigue stresses and exacerbate spoke failure due to fatigue.

There may be some cases where the spoke nipple may be constricted at its connection point at the rim such that the spoke nipple is held in perfect radial alignment, rather than self-aligning along the angle of inclination of the spoke. While this approach may reduce or eliminate the aforementioned offset, the result is that the spoke will instead be bent in a new region that is usually inboard of its connection at the rim. Again, the result is undesirable flex and fatigue of the spoke in this bent region.

In a rim with a concave outboard surface, the center of the outboard surface is radially inboard from axially spaced flanking outboard surfaces. With a radial spoke hole piercing a concave spoke bed the radial depth of the hole is deeper adjacent these outboard surfaces. This requires a larger spoke hole in order to accommodate the off-axis alignment of the nipple due the angle of inclination of the spoke. By definition, the larger spoke hole removes more material from the rim and therefore serves to weaken the rim.

Further objects and advantages of the present invention will appear hereinbelow.

SUMMARY OF THE INVENTION

In accordance with the present invention, it has now been found that the forgoing objects and advantages may be readily obtained.

In contrast to the flat or concave outboard surface of the spoke bed on prior art rim designs, the present invention utilizes a convex outboard surface of the spoke bed, where a portion of the outer surface of the spoke bed is raised to be radially outboard of an adjacent portion. With the spoke hole simultaneously piercing both the radially outboard portion and the adjacent portion, the result is a spoke hole with an outboard edge that includes a raised portion and a relieved portion(s) axially spaced from the raised middle portion. The spoke hole intersects both the raised portion and the relieved portion(s).

As shown in most of the embodiments of the resent invention, this raised portion is axially straddled by two axially spaced relieved portions. Thus, the transition portion of the spoke nipple bears primarily against the raised portion at its contact point and has no contact or only light contact at the relieved portions. As viewed in the rim cross section profile, it is often preferable that this raised contact point is generally aligned with the centerline of the spoke, thereby reducing or eliminating the offset associated with conventional wheels as described above. Thus the aforementioned bending moment at the spoke is reduced or eliminated, thereby increasing the fatigue life and stiffness of the wheel as compared to conventional wheels. Further, by reducing the stress and increasing the stiffness of the wheel, there now exists the opportunity to utilize thinner and slightly less robust spokes for a reduction in the overall weight and cost of the wheel.

In the preferred embodiment, the outboard edge of the spoke hole actually includes two circumferentially spaced raised portions that are axially flanked by relieved portions. Thus, the spoke nipple bears against these two raised portions to provide two contact points between the spoke bed and the transition portion of the nipple. This significantly reduces the contact stress in comparison to the singular contact point associated with conventional wheels as described above. Thus the galling, abrasion and deformation, associated with conventional wheels as described above, are significantly reduced.

Further, by carefully designing the geometry of the outer surface of the spoke bed, it is possible to create geometry where, in addition to the outboard portion, the relieved portion(s) also contact the transition portion of the spoke nipple. Thus, the contact point between the spoke bed and the transition portion of the nipple may extend as a continuous edge of contact, thereby further increasing contact area and further reducing the contact stress.

Since most rims are commonly produced by an extrusion process, this spoke bed geometry of the present invention may be easily and economically incorporated into the extrusion profile without any additional cost, as compared to rims of conventional spoke bed geometry.

Many of the embodiments of the present invention do not require any additional inserts between the spoke nipple and the spoke bed and therefore none of the additional associated costs are required. However, if such an insert is desired, the insert may be designed to be symmetrical so that the tedious orientation of the insert during assembly is not required, thereby reducing assembly cost.

In a rim with a convex outboard surface, the center of the surface is radially outboard from axially spaced flanking inboard surfaces. With a radial spoke hole piercing a concave spoke bed the radial depth of the hole is shallower adjacent these outboard surfaces. This requires less clearance between the shank of the nipple and the spoke hole. Thus, the spoke hole diameter is reduced, while still accommodating the off-axis alignment of the nipple due the angle of inclination of the spoke. Thus, in comparison with a spoke bed that utilizes a convex outer surface, the spoke hole may be smaller and the resulting rim may be stronger.

Thus, the present invention has several advantages over existing wheel designs, including: an increase in the fatigue life of the wheel; a reduction in the weight of the wheel; an increase in the lateral stiffness of the wheel; reduction or elimination of the galling and abrasion between the spoke and the nipple; the ability to produce the wheel economically at low cost; and an increase in strength of the rim.

The novel features which are believed to be characteristic of the invention, both as to organization and method of operation, together with further objects and advantages thereof, will be better understood from the following description of the accompanying drawings of the embodiments of the present invention. It is expressly understood, however, that the drawings are for the purpose of illustration and description only and are not intended as a definition of the limits of the invention.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 2d is a radial plane cross-section detail view of the wheel of FIG. 2a.

FIG. 3b is a cross-section detail view of the wheel of FIG. 3a.

FIG. 4c is a radial cross-section detail view of the embodiment of FIG. 4b.

DETAILED DESCRIPTION OF THE INVENTION

Figure 1A:
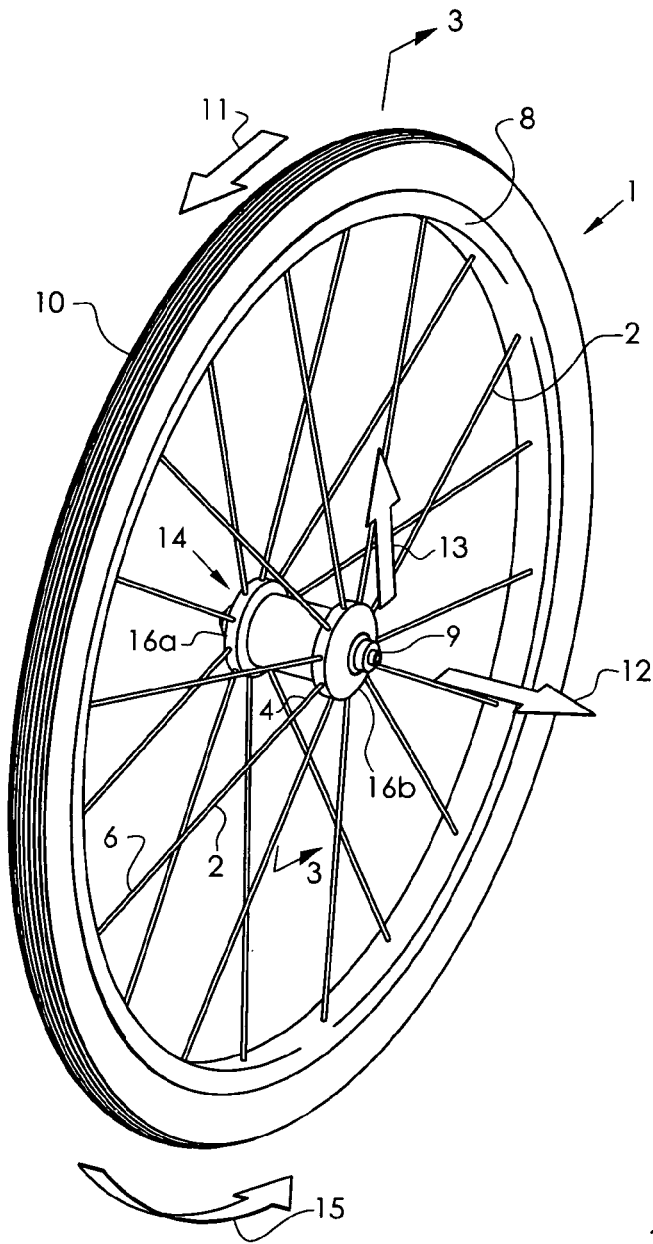
FIG. 1a is a perspective view schematically illustrating the general configuration of a vehicle wheel as applied to a bicycle wheel.
Figure 1B:
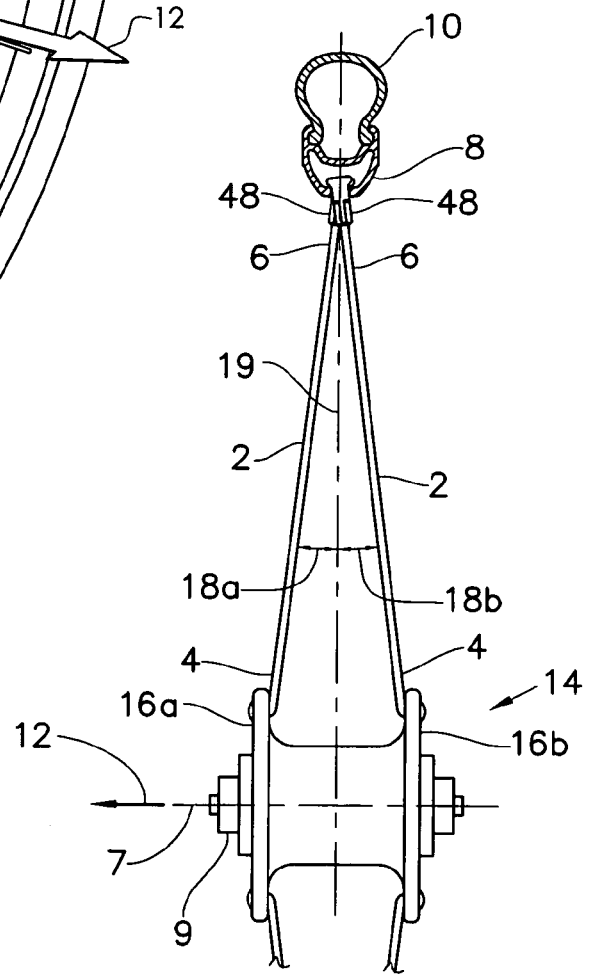
FIG. 1b is a radial plane cross-sectional view of the wheel of FIG. 1a along 3-3.

FIGS. 1a-b describes the basic configuration of a vehicle wheel, in particular, a bicycle wheel 1, as well as a description of the direction conventions used throughout this disclosure. The hub shell 14 is rotatable about the axle 9 and includes at least two axially spaced hub flanges 16a and 16b, each of which include a means for connecting with the spokes 2. The spokes 2 are affixed to the hub flanges 16a and 16b at their first end 4 and extend to attach the rim 8 at their second end 6. The tire 10 is fitted to the outer periphery of the rim 8. The axial direction 12 is any direction parallel with the centerline axis 7 of the axle 9. The radial direction 13 is a direction generally perpendicular to the axial direction 12. The outboard direction is any direction extending away from the centerline of the axle 9 at a point midway between hub flanges 16a and 16b.

For example, a radially outboard location is a location distal from the centerline axis 7. Conversely, a radially inboard location is a location proximal to the centerline axis 7. The tangential direction 11 is a direction perpendicular to the radial direction 13 at a given radius. The circumferential direction 15 is a cylindrical vector that wraps around the axial direction 12 axis at a given radius. Further, an axial plane (not shown), such as the plane defined by the circular perimeter of the rim 8, is a plane defined by two radial vectors originating from a given axial location. A radial plane (not shown), such as the cross section plane shown in FIG. 1*b*, is a plane defined by a radial vector and an axial vector. It may be seen in FIG. 1*b* that the spokes 2 are inclined such that their first ends 4 are axially outboard from their second end 6. Thus, a first series of spokes 2 that are affixed to hub flange 16*a* have first ends 4 that are axially spaced from a second series of spokes 2 that are affixed to hub flange 16*b* at their respective first ends 4. The second end 4 of spokes 2 are connected to the rim 8 via spoke nipples 48. The first series of spokes 2 incline and converge axially with respect to the second series of spokes 2 as they extend in a generally radial direction to their connection with the rim 8. Thus, relative to a radial centerline 19, the first series of spokes have an angle of inclination 18*a* and the second series of spokes 2 have an angle of inclination 18*b*. It is this angle of inclination 18*a* (and 18*b*), combined with the pre-tension of the spokes 2, which impart axial rigidity to the wheel 1.

FIGS. 2*a-f* describe an exemplary rim 20 of generally conventional geometry. As detailed in FIGS. 2*a* and 2*b*, rim 20 is of a generally hollow construction, commonly termed "double-wall" construction, and includes a radially inboard spoke bed 22 wall and a radially outboard tire bed 24 wall and generally radially extending sidewalls 26*a* and 26*b* to define a generally hollow circumferential cavity 28. Spoke bed 22 is defined by a radially inboard surface 32 and a radially outboard surface 34. Hooked flanges 30*a* and 30*b* are adapted to engage the beads of a conventional tire (not shown).

Figure 2A:
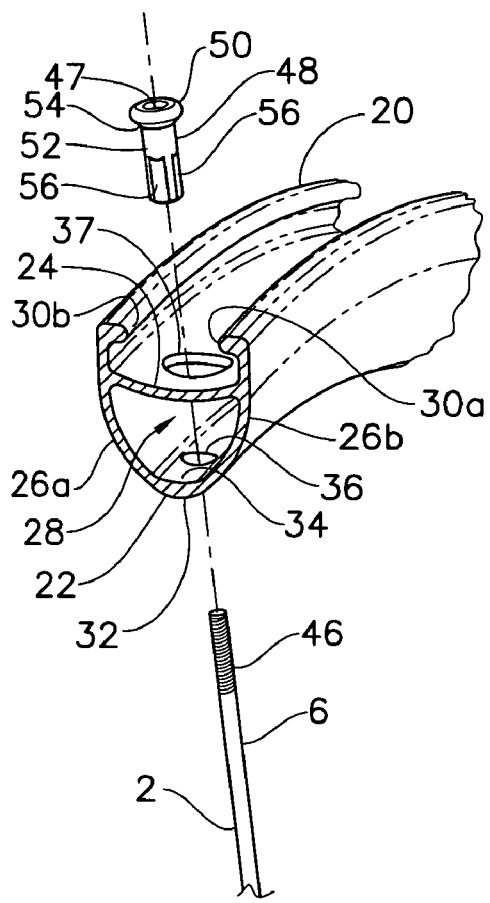
FIG. 2a is a partial perspective exploded view of a wheel of prior art design, with the rim shown in radial plane cross-section.
Figure 2C:
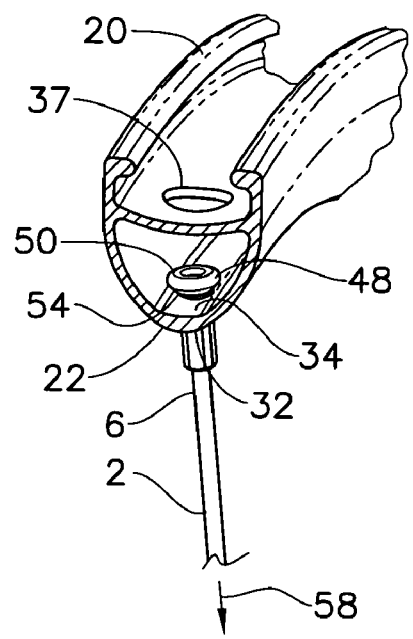
FIG. 2c is a partial perspective view, with the rim in cross-section, showing the wheel of FIG. 2a with the spoke and nipple assembled to the rim.
Figure 2B:
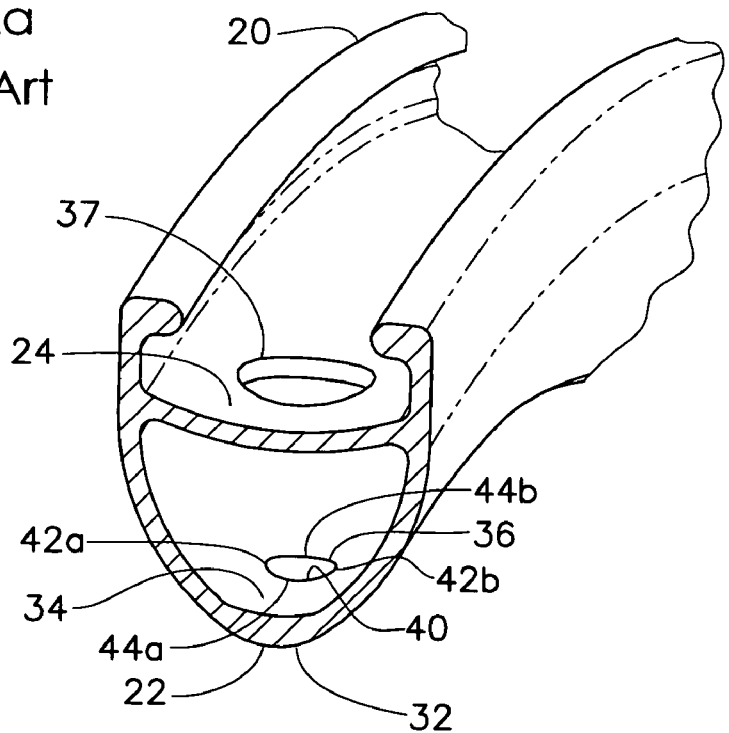
FIG. 2b is an enlarged detail of a portion of the rim of FIG. 2a, with the rim shown in radial plane cross-section.

The spoke bed 22 is pierced with a plurality of spoke holes 36 adapted for connection with their respective spokes 2 via spoke nipples 48. It may be seen that the spoke hole 36 has a radially inboard edge 38 at its intersection with the inboard surface 32 and a radially outboard edge 40 at its intersection with the radially outboard surface 34. Further, outboard edge 40 may be seen to have axially spaced quadrant points 42*a* and 42*b* as well as circumferentially spaced quadrant points 44*a* and 44*b*. The tire bed 24 is pierced by clearance hole 37 that is aligned with spoke hole 36, to permit the nipple 48 to be assembled as shown in FIGS. 2*a* and 2*c*. Note that clearance hole 37 is merely one common means to permit the nipple 48 to be assembled to the rim; a wide range of alternative means may be substituted, including means that do not require a clearance hole.

It is useful to understand that it is common to manufacture the rim 20 by extruding the straight profile shown here and rolling the extrusion into a circumferential hoop with its ends joined by either a welded, sleeved or pinned connection. Spoke holes 36 and clearance holes 37 are then drilled in their proper locations.

FIG. 2*a* shows an exploded view that describes the conventional arrangement by which the second end 6 of the spoke 2 is connected to the rim 20. The second end 6 of spoke 2 includes external threads 46 to mate with internal threads 47 of spoke nipple 48. Spoke nipple 48 includes an enlarged head 50 and a shank 52, with a generally conical tapered transition portion 54 extending between the underside of the head 50 and the shank 52. Spoke nipple 48 also includes flats 56 for engagement with a mating wrench (not shown) for manual manipulation to adjust the spoke pre-tension by adjusting the threaded engagement between external threads 46 and internal threads 47. FIGS. 2*c-f* shows the spoke nipple 48 threadably assembled to the spoke 2 such that the transition portion 54 overlies and contacts the outboard edge 40. The spoke nipple 48 is thereby braced against the spoke bed 22 to resist the spoke tension 58 of the spoke 2.

Figure 2F:
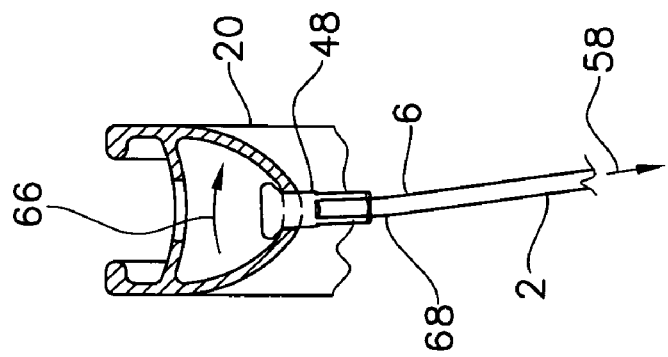
FIG. 2f is a cross-section detail view of the wheel of FIG. 2a, showing a bent region of the spoke.
Figure 2E:
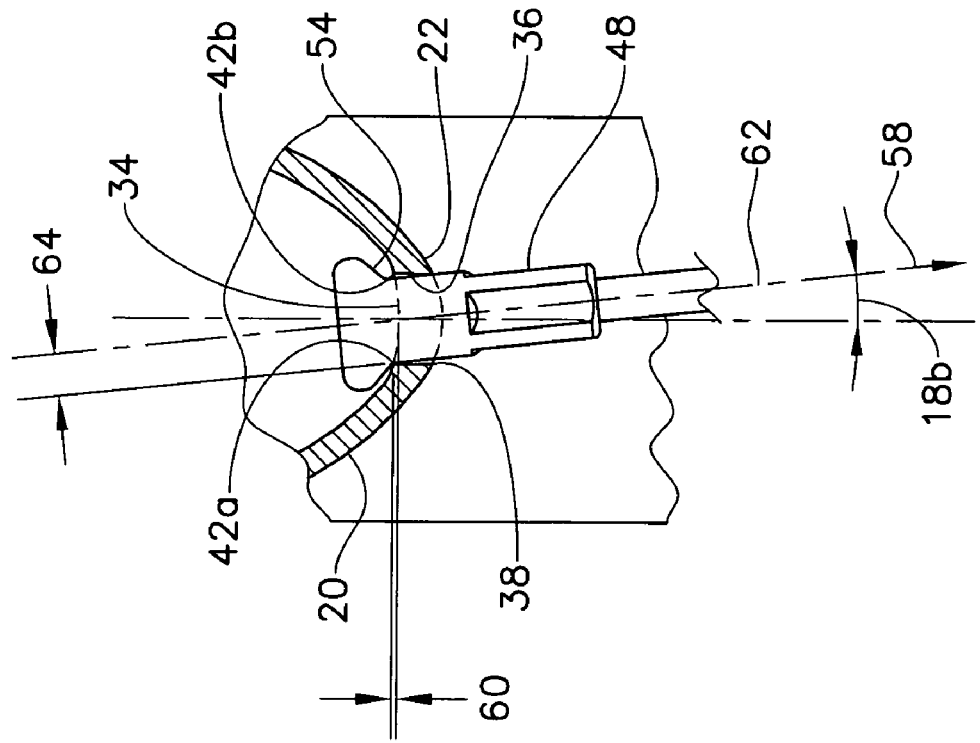
FIG. 2e is a cross-section detail view along 57 of FIG. 2d.
Figure 2D:
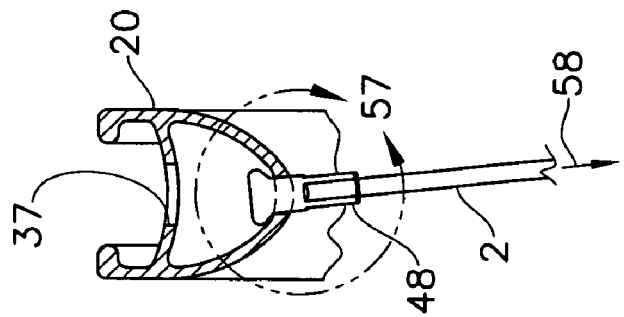

It may be seen that the outboard surface 34 of the spoke bed 22 is of generally concave geometry as viewed in the cross sectional views of FIGS. 2*d-f*. Thus the intersection between the cylindrical spoke hole 36 and the concave outboard surface 34 creates a saddle-shaped outboard edge 40, such that quadrant points 42*a* and 42*b* are spaced by radial distance 60 to be radially outboard of quadrant points 44*a* and 44*b*. With spoke nipple 48 aligned with angle of inclination 18*b* as shown, it may be seen that the transition portion 54 contacts the outboard surface 34 of the spoke bed 22 only at the quadrant point 42*a*, which is offset from the spoke centerline 62 by distance 64. Shank 52 also contacts inboard edge 38, which restrains axial movement of the nipple 48 and forces the transition portion 54 against quadrant point 42*a*. With the transition portion 54 supported only by quadrant portion 42*a*, it may be seen that the transition portion 54 does not contact, and is spaced from, the outboard edge 40 at quadrant points 42*b*, 44*a* and 44*b*.

Since the spoke tension 58 acts along the spoke centerline 62, the offset distance 64 (between the spoke centerline 62 and contacting quadrant point 42*a*) tends to induce a moment to rotate the spoke nipple 48 in the direction 66 toward a reduced angle of inclination 18*b* that is no longer in alignment with the spoke centerline 62. Further, the spoke tension 58 tends to induce the conical transition portion 54 to ramp against its contact point at quadrant point 42*a*. This, in combination with the contact between the inboard edge 38 and shank 52 further induces the nipple 48 to rotate in the direction 66. The result is that the spoke 2 tends to bend in response to the aforementioned moment, thus creating a bent region 68 just inboard of the spoke nipple 48 and thereby inducing a bending stress in the spoke 2. As with all tension-spoke wheels, as the loaded wheel 1 is rotated along the ground, each successive spoke undergoes a cycle of reduced and increased spoke tension 58. This causes the bent region 68 to flex with each revolution of the wheel, creating a much higher potential for fatigue failure of the spoke 2 as compared to a spoke without a bent region 68 and its associated bending stress. Further, the bending and associated flex described here tends to reduce the effective tensile stiffness of the spoke 2 between its attachment points, thereby reducing the overall structural stiffness of the wheel 1.

Further, since the majority of the spoke tension 58 is braced and resisted by the overlie engagement between the nipple 48 and only the single contact point at quadrant point 42*a*, the contact stresses at this singular contact point are very high. This high contact stress may result in localized galling as the nipple 48 is rotatably manipulated with in its spoke hole 36. Further, this high contact stress may cause excessive stress and deformation of the nipple 48 and/or spoke hole 36.

Figure 3A:
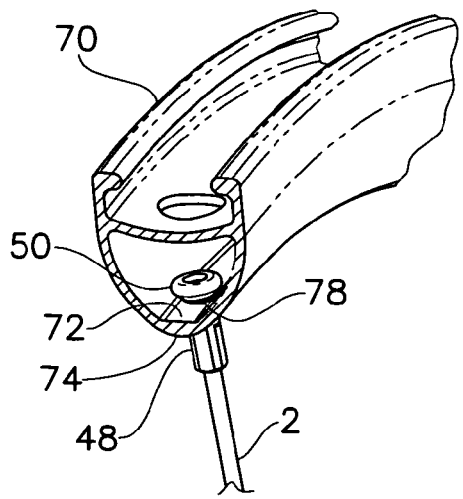
FIG. 3a is a partial perspective view of a wheel of prior art design, with the rim in cross-section.
Figure 3B:
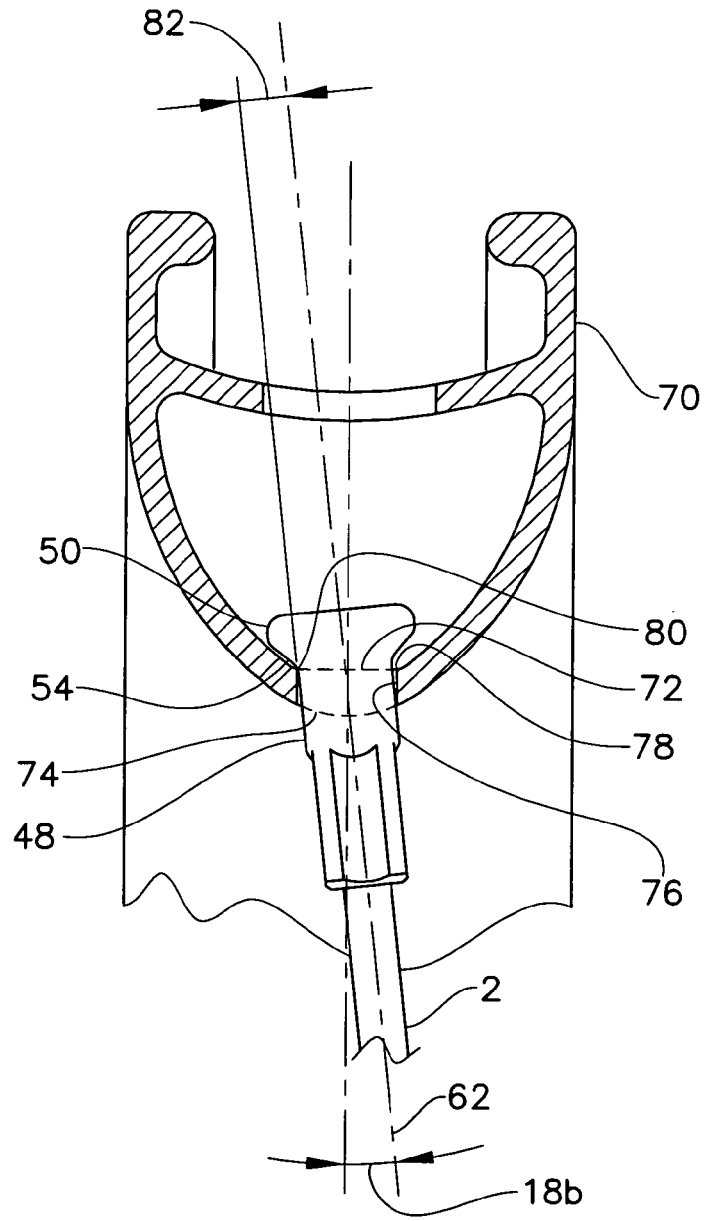

FIGS. 3*a-b* describe another exemplary rim 70 of conventional geometry. Rim 70 is generally identical to rim 20, however the outboard surface 72 of spoke bed 74 instead has a generally flat cross section defining a generally flat cylindrical surface. This means that outboard edge 78 of spoke hole 76 is a flat circular edge. However, due to the inclination angle 18*b* of the spoke 2 and spoke nipple 48, the transition portion 54 contacts the outboard edge 78 at only a single contact point 80, which is offset from the spoke centerline by offset distance 82. Like the prior art embodiment of FIGS.

2*a-f*, this offset distance 82 induces a bending moment in the spoke, including the associated bending and flex previously described herein.

Thus, it may be seen that it is advantageous to reduce or eliminate the offset distance 64 or 82 to minimize the bending or flex associated with the prior-art arrangements described in FIGS. 2*a-f* and FIGS. 3*a-b*. The following embodiments of the present invention describe a variety of methods to reduce or eliminate this offset distance.

Figure 4A:
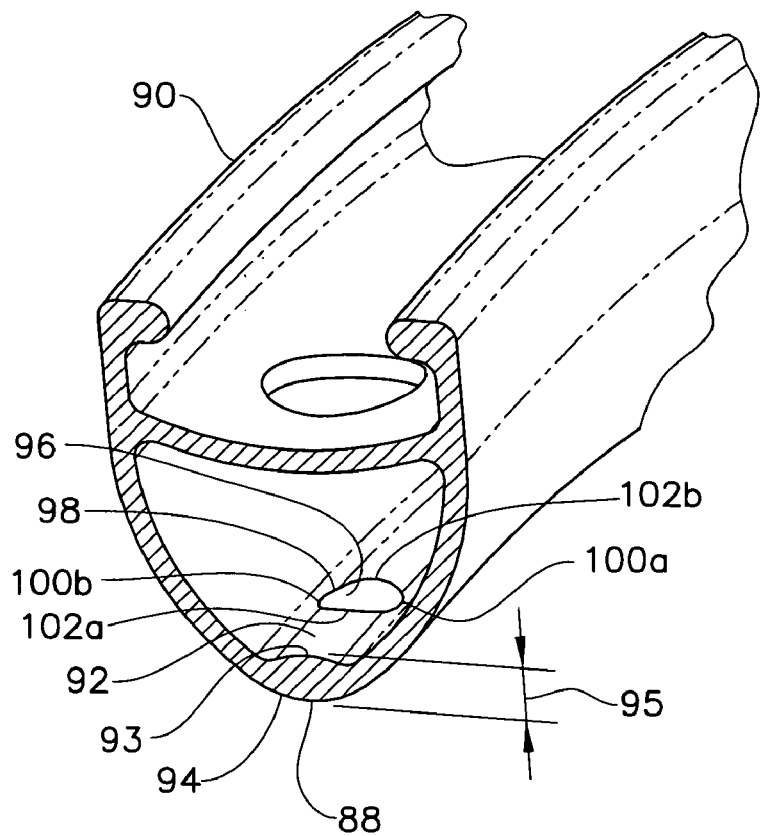
FIG. 4a is a partial perspective detail of the rim of an embodiment of the present invention, with the rim shown in cross-section.
Figure 4B:
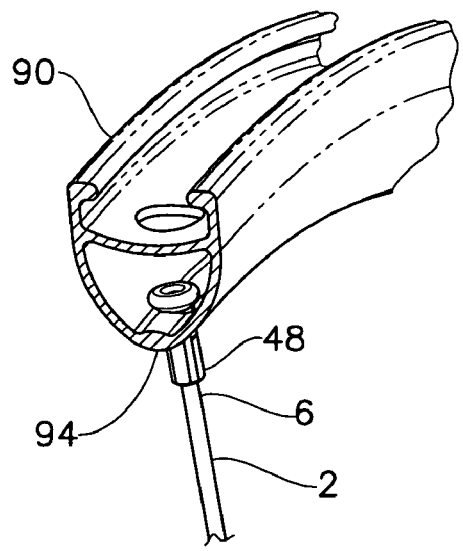
FIG. 4b is a partial perspective view, showing the embodiment of FIG. 4a, with the rim in cross-section and with the spoke and nipple assembled to the rim.

FIGS. 4*a-d* describes an embodiment of the present invention where the rim 90 utilizes a convex outboard surface 92 of spoke bed 94. Rim 90 is otherwise shown here to be identical to the rim 20 of FIGS. 2*a-f*. Rim 90 includes a spoke bed 94 with an outboard surface 92 that has a generally rounded or arcuate convex cross-sectional profile to include a radially outboard apex 93. Spoke bed 94 also includes radially inboard surface 88. It should be noted that the rim 90 may be produced by the extrusion process as previously described. The extrusion profile, as shown in FIG. 4*a*, includes the convex outboard surface 92. Thus, the convex outboard surface 92 may be a continuous circumferential outboard surface that is integral with the rim 90.

The spoke bed 94 is pierced with a plurality of spoke holes 96 adapted for connection with their respective spokes 2. It may be seen that the spoke hole 96 has a radially outboard edge 98 at its intersection with the radially outboard surface 92. Outboard edge 98 may be seen to have axially spaced quadrant points 100*a* and 100*b* as well as circumferentially spaced quadrant points 102*a* and 102*b*. Spoke hole 96 has a radially inboard edge 89 at its intersection with the radially inboard surface 88. While the spoke holes 96 may be drilled at an angle to follow the angle of inclination 18*a* and/or 18*b* of the corresponding spokes, it is often simpler and more economical to drill the spoke holes 96 with a straight radial spoke hole centerline 63 as shown in FIG. 4*c*.

It may be seen that the outboard surface 92 of the spoke bed 94 is of generally convex geometry as viewed in the cross sectional views of FIGS. 4*a-d*. Thus the intersection between the cylindrical spoke hole 96 and the convex outboard surface 92 creates a saddle-shaped outboard edge 98, such that quadrant points 100*a* and 100*b* (which are shown here to axially straddle the apex 93) are spaced by radial distance 104 to be radially inboard of quadrant points 102*a* and 102*b*, which are at or near the apex 93. Thus, it may be interpreted that quadrant points 100*a* and 100*b* are radially relieved in comparison with quadrant points 102*a* and 102*b*. Further, it is shown that spoke bed 94 includes a radially outboard portion at apex 93 that is axially flanked by radially inboard portions on either side of apex 93.

Figure 4C:
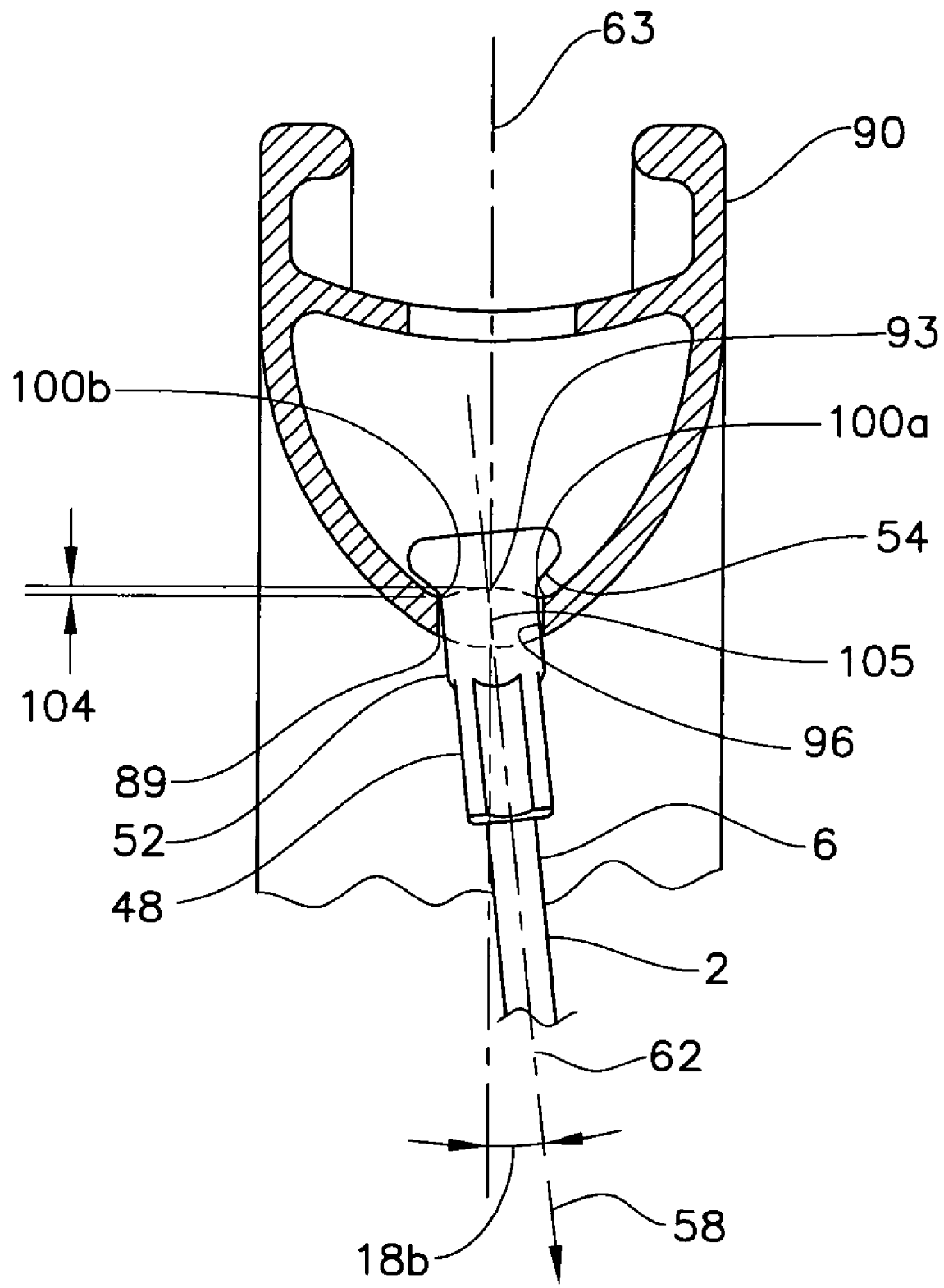
FIG. 4c is a cross-section detail view of the embodiment of FIG. 4b.

With spoke nipple 48 aligned with angle of inclination 18*b* as shown in FIG. 4*c*, it may be seen that the transition portion 54 contacts the outboard edge 98 of the spoke hole 96 at the circumferentially spaced quadrant points 102*a* and 102*b*, which are generally in alignment with the spoke centerline 62. It may be seen that quadrant points 100*a* and 100*b* are thus radially relieved to provide clearance for the transition portion 54. Transition portion 54 does not contact or has only light contact with the outboard edge 98 at quadrant points 100*a* and/or 100*b*, permitting the spoke nipple 48 to accommodate angles of inclination 18*a* and/or 18*b* and thereby maintain straight or near-straight alignment with the spoke 2. Thus, any offset distance, as previously described, is reduced or eliminated, thereby reducing or eliminating the corresponding bending and/or flex in the spoke 2.

The spoke nipple 48 is thereby braced against the spoke bed 94 by an overlie engagement between the spoke nipple 48 and the spoke hole 96 to resist the spoke tension 58 of the spoke 2. Since the majority of the spoke tension 58 is now resisted by the overlie engagement between the nipple 48 and two contact points (quadrant points 102*a* and 102*b*), the contact stresses are now shared between these two quadrant points and are thereby reduced in comparison with the single contact point of the prior art arrangements of FIGS. 2*a-f* and FIGS. 3*a-b*. This effectively doubles the contact area and thus halves the contact stress to reduce the galling or deformation between the nipple 48 and the spoke hole 96. Further, by adjusting the geometry of the outboard surface 92 and the diameter of the spoke hole 96, the outboard edge 98 may be matched with the geometry of the transition portion 54 for a given angle of inclination 18*a* and/or 18*b*. This matched contact can make it possible to have generally even contact between the transition portion 54 and approximately 180° of the outboard edge 98, including quadrant points 102*a*, 100*a* and 102*b*, thus further reducing the contact stress.

Figure 4D:
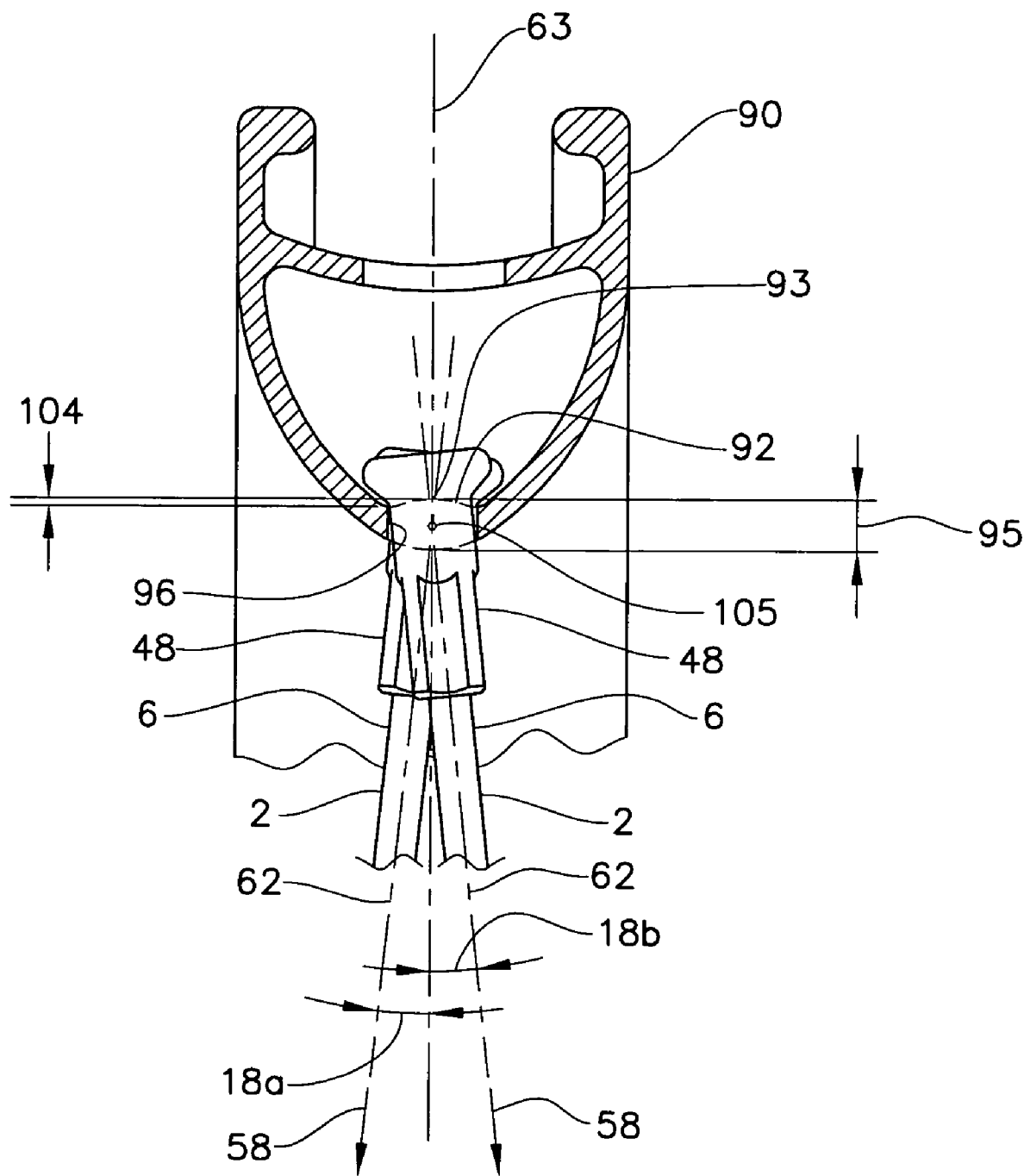
FIG. 4d is a radial cross-section detail view of the embodiment of FIG. 4b, with a second spoke with opposed angle of inclination.

It may be preferable to drill the spoke holes 96 to have a perfectly radial spoke hole centerline 63, since this may effectively split the difference between spokes of positive angles of inclination 18*b* and negative angles of inclination 18*a*. In FIGS. 4*c-d*, it may be seen that the spoke centerline 62 crosses radial spoke hole centerline 63 at a crossover point 105 that is preferably located to be radially close to midway between inboard surface 88 and the outboard surface 92. This is desirable, since it minimizes the clearance required between the shank 52 and spoke hole 96 to accommodate misalignment between the two due to the angle of inclination 18*a* and/or 18*b* and thus permits the spoke hole diameter to be minimized. A minimized spoke hole 96 diameter will remove less rim material and thus maintain maximum rim strength. Further, it should also be noted that the wall thickness of the spoke bed 94 is variable with a greater thickness 95 near the apex 93. This greater thickness 95 may provide additional structural strength and stiffness to the rim 90.

Spoke hole 96 is centered on the apex 93 and the outboard surface 92 is shown to be axially symmetrical about an axial plane. Further, outboard surface 92 is shown to be a continuous circumferential outboard surface such that the spoke hole 96 geometry is circumferentially symmetrical about a given radial plane.

In such a symmetrical design, the straight radial spoke hole is not "handed" and may accommodate spokes with both positive angles of inclination 18*b* and negative angles of inclination 18*a* as shown in FIG. 4*d*. However, it may alternatively be desirable to introduce asymmetrical geometry to the design so that it may be more closely tailored to specific angles of inclination 18*a* and/or 18*b*. In one alternate arrangement the outboard surface 92 may have contour that is asymmetrical about an axial plane to more closely accommodate an angle of inclination 18*a* that is different from angle of inclination 18*b*. In another alternative, the spoke hole centerline 63 may instead be simply axially offset from the apex 93, which may alter the geometry of the outboard edge 98 such that it may be tailored to accommodate a given angle of inclination 18*a* that is different from angle of inclination 18*b*. In a further alternative design, the spoke hole 96 may be drilled with a spoke hole centerline 63 that is inclined at an inclination angle from true radial such that the spoke hole 96 and the outboard edge 98 are adapted to more closely accommodate the angle of inclination 18*a* and/or 18*b*.

In a still further alternative, the outboard surface 92 may be designed without a continuously circumferential surface and may instead have geometry that is circumferentially asymmetrical about a given radial plane. In such a case, the geometry of the outboard surface and/or the outboard edge may be different between circumferentially spaced quadrant points 102*a* and 102*b*. This type of asymmetry may be employed to accommodate the circumferential angles of inclination (not shown) of spokes 2 that are circumferentially inclined from true radial. Such a circumferential angle of inclination is commonly associated with tangential or oblique spoke lacing.

Figure 5A:
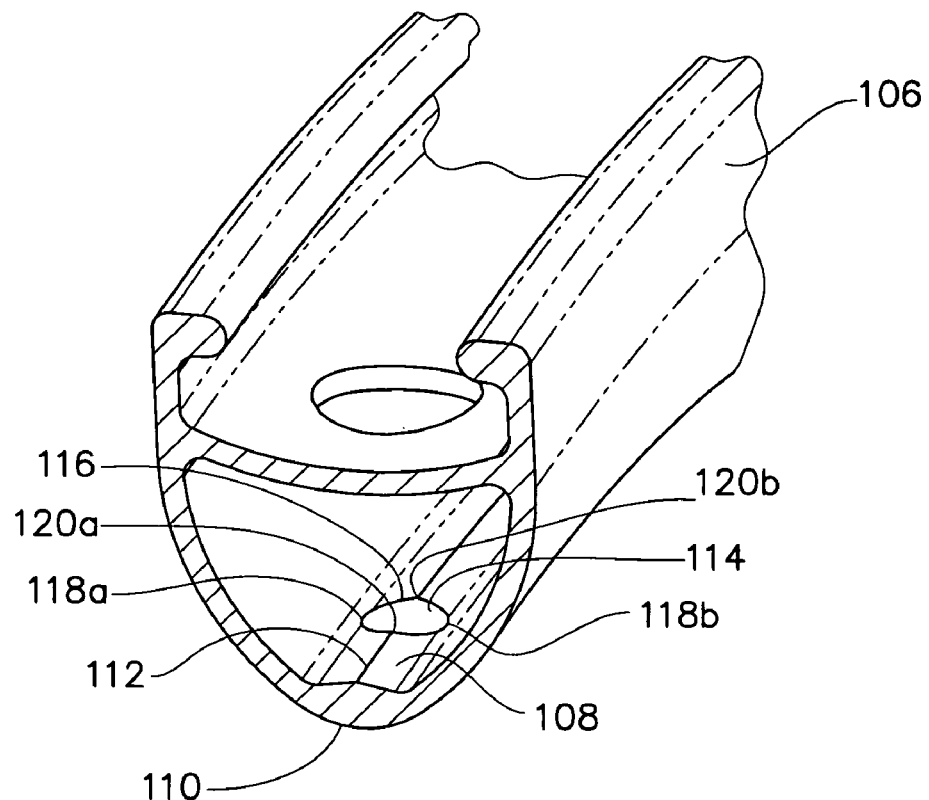
FIG. 5a is a partial perspective detail of the rim of a second embodiment of the present invention, with the rim shown in cross-section.
Figure 5B:
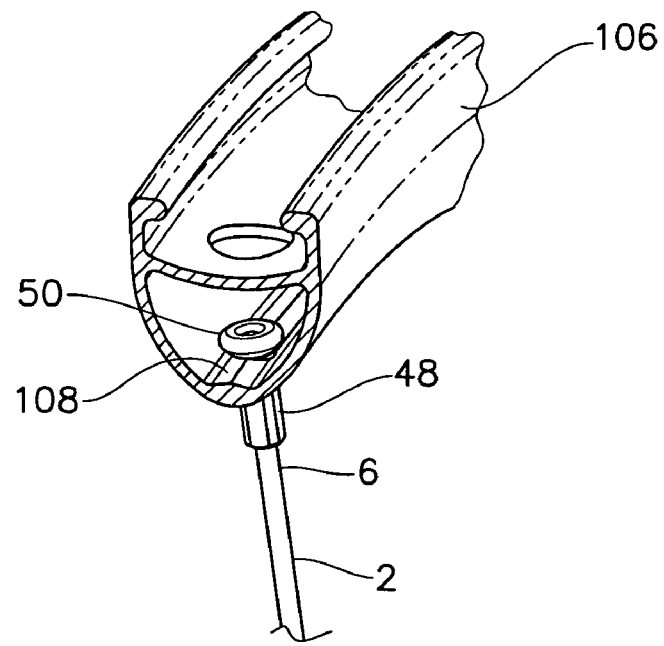
FIG. 5b is a partial perspective view, showing the embodiment FIG. 5a with the rim in cross-section and with the spoke and nipple assembled to the rim.
Figure 5C:
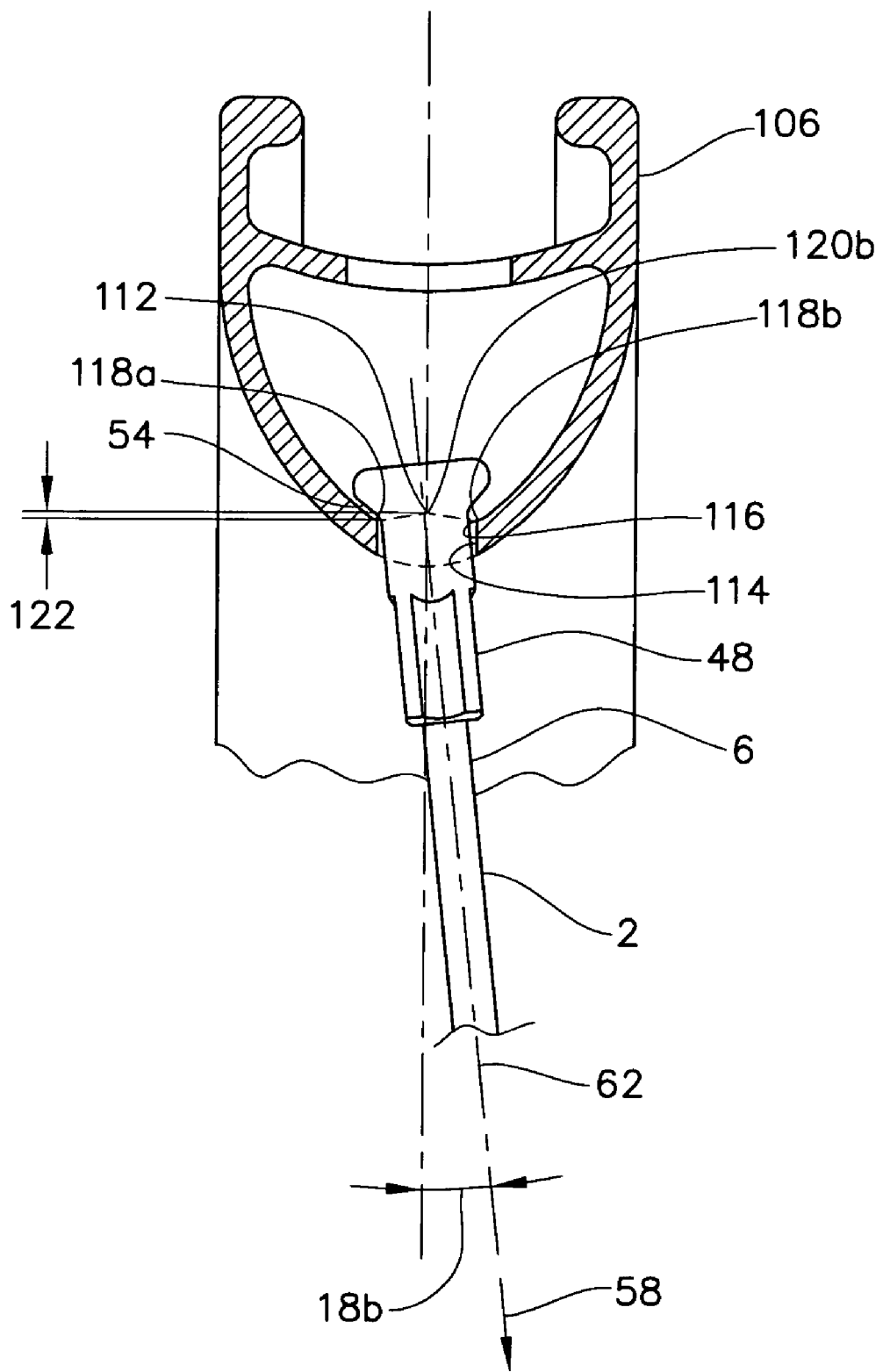
FIG. 5c is a radial cross-section detail view of the embodiment of FIG. 5b.

FIGS. 5*a-c* describe an embodiment of the present invention where the rim 106 utilizes an inverted "V"-shaped convex outboard surface 108 of spoke bed 110. Rim 106 is otherwise identical to the rim 20 of FIGS. 2*a-f*. Rim 106 includes a spoke bed 110 with a radially outboard surface 108 that is convex to include a radially outboard peaked apex 112. In contrast to the rounded or arcuate apex of the embodiment of FIGS. 4*a-d*, the embodiment of FIGS. 5*a-c* utilizes a pointed or peaked apex with sloped sides.

The spoke bed 110 is pierced with a plurality of spoke holes 114 adapted for connection with their respective spokes 2. It may be seen that the spoke hole 114 has a radially outboard edge 116 at its intersection with the radially outboard surface 108. Further, outboard edge 116 may be seen to have axially spaced quadrant points 118*a* and 118*b* as well as circumferentially spaced quadrant points 120*a* and 120*b*.

In a manner similar to that described in FIGS. 4*a-d*, it may be seen that the outboard surface 108 of the spoke bed 110 is also of generally convex geometry. Thus the intersection between the cylindrical spoke hole 114 and the convex outboard surface 108 creates a peaked outboard edge 116, such that quadrant points 118*a* and 118*b*, which axially straddle the peaked apex 112, are spaced by radial distance 122 to be radially inboard of quadrant points 120*a* and 120*b*, which are at or near the peaked apex 112. With spoke nipple 48 aligned with angle of inclination 18*b* as shown in FIG. 5*c*, it may be seen that the transition portion 54 contacts the outboard edge 116 of the spoke hole 114 at or near the circumferentially spaced quadrant points 120*a* and 120*b*. The spoke nipple 48 is thereby braced against the spoke bed 110 to resist the spoke tension 58 of the spoke 2. The beneficial results are similar to those described in FIGS. 4*a-d*.

Figure 6A:
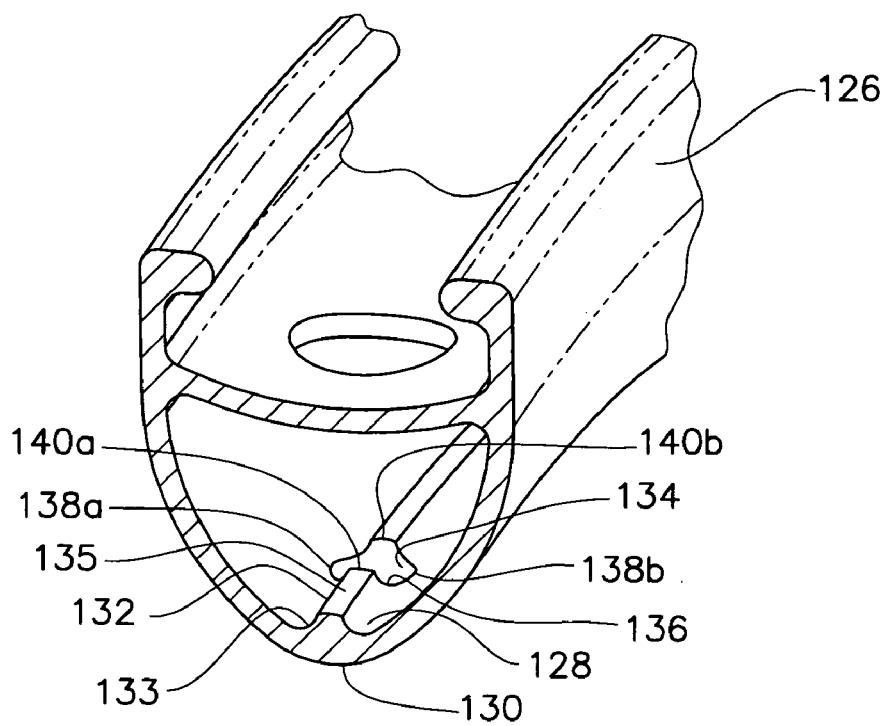
FIG. 6a is a partial perspective detail of the rim of a third embodiment of the present invention, with the rim shown in cross-section.
Figure 6B:
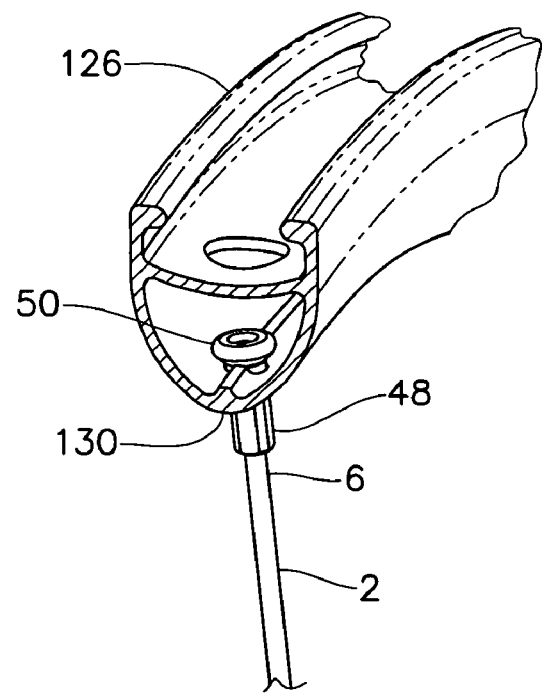
FIG. 6b is a partial perspective view, showing the embodiment FIG. 6a with the rim in cross-section and with the spoke and nipple assembled to the rim.
Figure 6C:
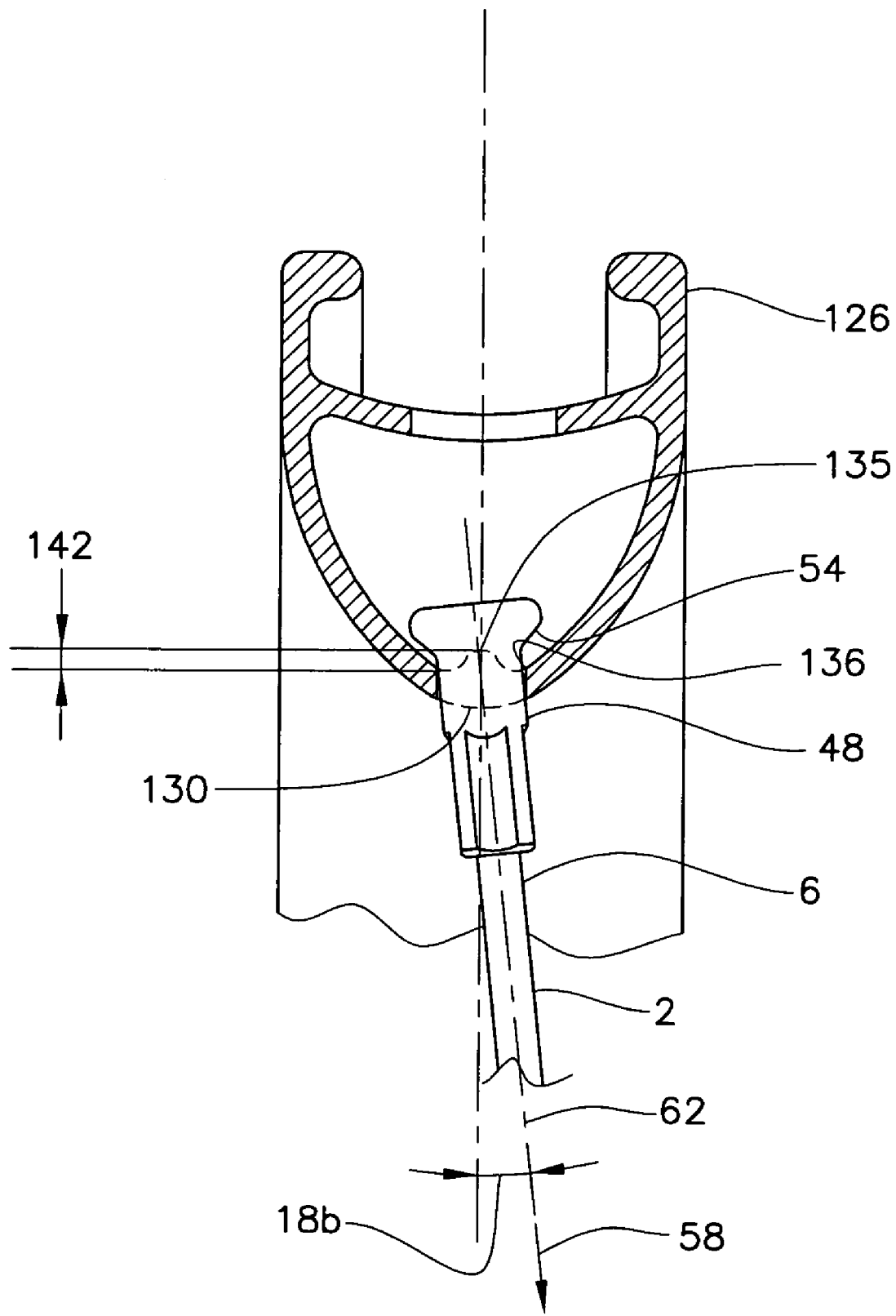
FIG. 6c is a cross-section detail view of the embodiment of FIG. 6b.

FIGS. 6*a-c* describes an embodiment of the present invention where the rim 126 utilizes a rib profile to create a radially outboard contact point with the nipple 48. Rim 126 is otherwise identical to the rim 20 of FIGS. 2*a-f*. Rim 126 includes a spoke bed wall 130 with an outboard surface 128 that includes a radially outwardly extending rib 132. Rib 132 includes a base portion 133 connected to the outboard surface 128 of the spoke bed 130, and a radially outboard apex tip 135. Since rib 132 is radially outboard from base portion 133, it may be interpreted that outboard surface 128 is a convex outboard surface.

The spoke bed 130 is pierced with a plurality of spoke holes 134 adapted for connection with their respective spokes 2. It may be seen that the spoke hole 134 pierces through the rib 132 and has a radially outboard edge 136 at its intersection with the radially outboard surface 128 and rib 132. Further, outboard edge 136 may be seen to have axially spaced quadrant points 138*a* and 138*b* as well as circumferentially spaced quadrant points 140*a* and 140*b*.

It may be seen that the intersection between the cylindrical spoke hole 134 and the outboard surface 128, which includes rib 132, creates a convoluted outboard edge 136. Thus, circumferentially-spaced quadrant points 140*a* and 140*b* generally coincide with the apex tip 135 of rib 132 and are located to be radially outboard by radial distance 142 from quadrant points 138*a* and 138*b*, which are shown here to axially straddle the apex tip 135. With spoke nipple 48 aligned with angle of inclination 18*b* as shown in FIG. 6*c*, it may be seen that the transition portion 54 contacts the outboard edge 136 of the spoke hole 134 at or near the circumferentially spaced quadrant points 140*a* and 140*b*, which is generally in alignment with the spoke centerline 62. The spoke nipple 48 is thereby braced against the spoke bed 130 to resist the spoke tension 58 of the spoke 2. The beneficial results are similar to those described in FIGS. 4*a-f*.

The rib 132 profile in FIGS. 6*a-c* is shown to have a flattened tip 135. Alternatively, it may be beneficial to employ a rib profile with a rounded tip or some other tip geometry. Further, the rib 132 may be viewed as a radially-outwardly extending projection that supports the spoke nipple 48.

The previous embodiments describe an arrangement where the rim includes a convex outboard surface that extends to wrap circumferentially around the rim. This is a very efficient and economical method of creating such a convex surface, especially when the rim is already produced from an extruded profile. However, the entire circumference of the spoke bed may then need to have the additional thickness to accommodate this convex profile, which may result in additional weight. Also, it may be difficult to create the convex geometry due to fabrication limitations. For example, it may be difficult to drill through an apex surface without the drill tip being deflected by the apex, leading to inaccuracies of the drilled spoke hole. Thus, it may be desirable to utilize a separate insert to provide the requisite convex surface.

Figure 7A:
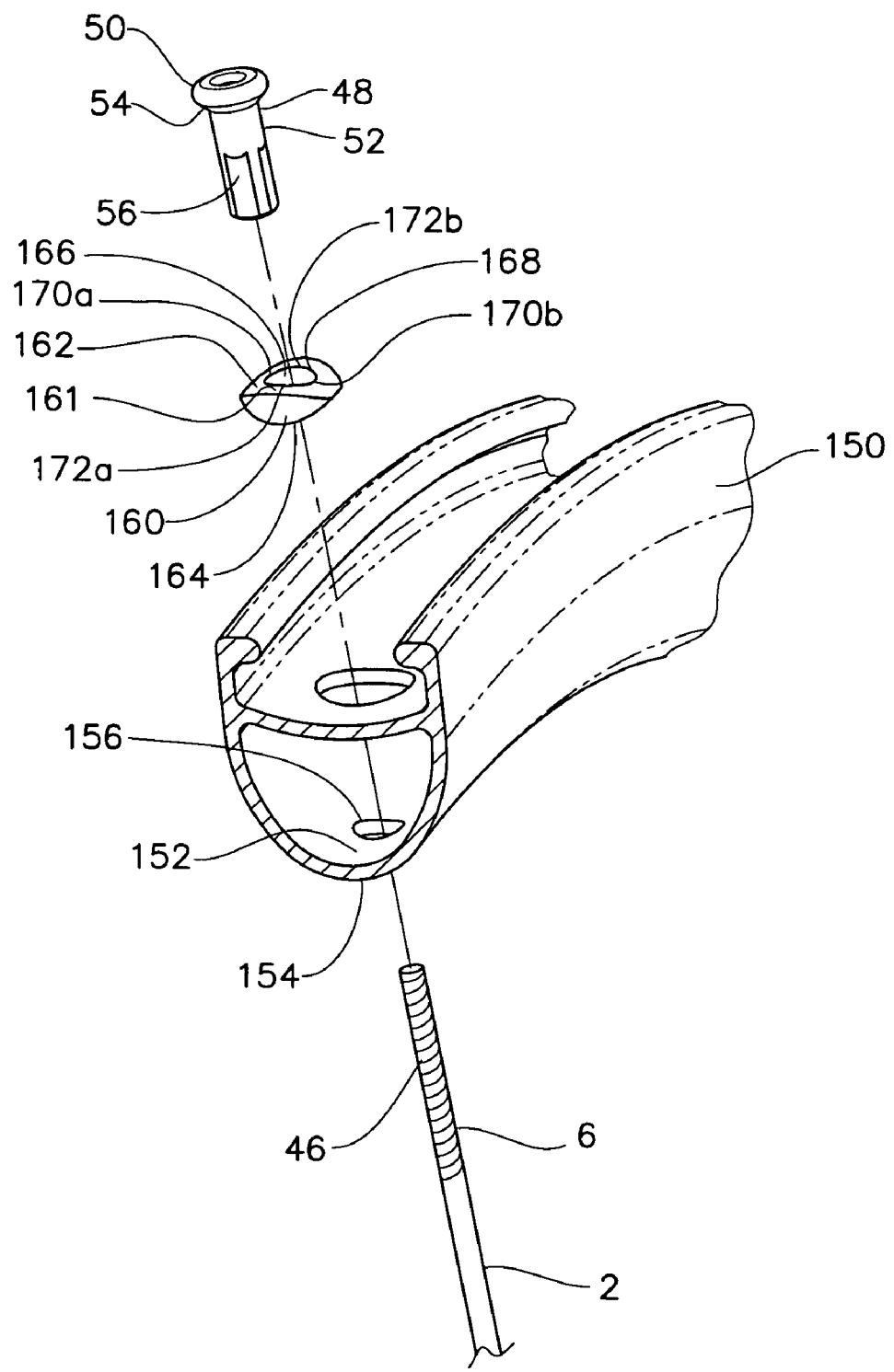
FIG. 7a is a partial perspective exploded view of a wheel of a fourth embodiment of the present invention, with the rim in cross-section.
Figure 7B:
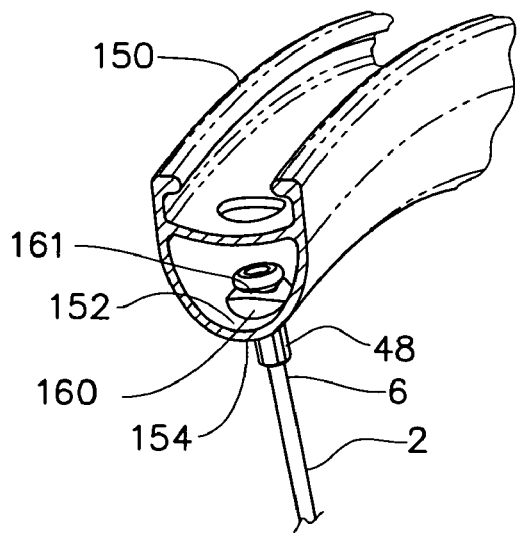
FIG. 7b is a partial perspective view, showing the embodiment FIG. 7a with the rim in cross-section and with the spoke and nipple assembled to the rim.
Figure 7C:
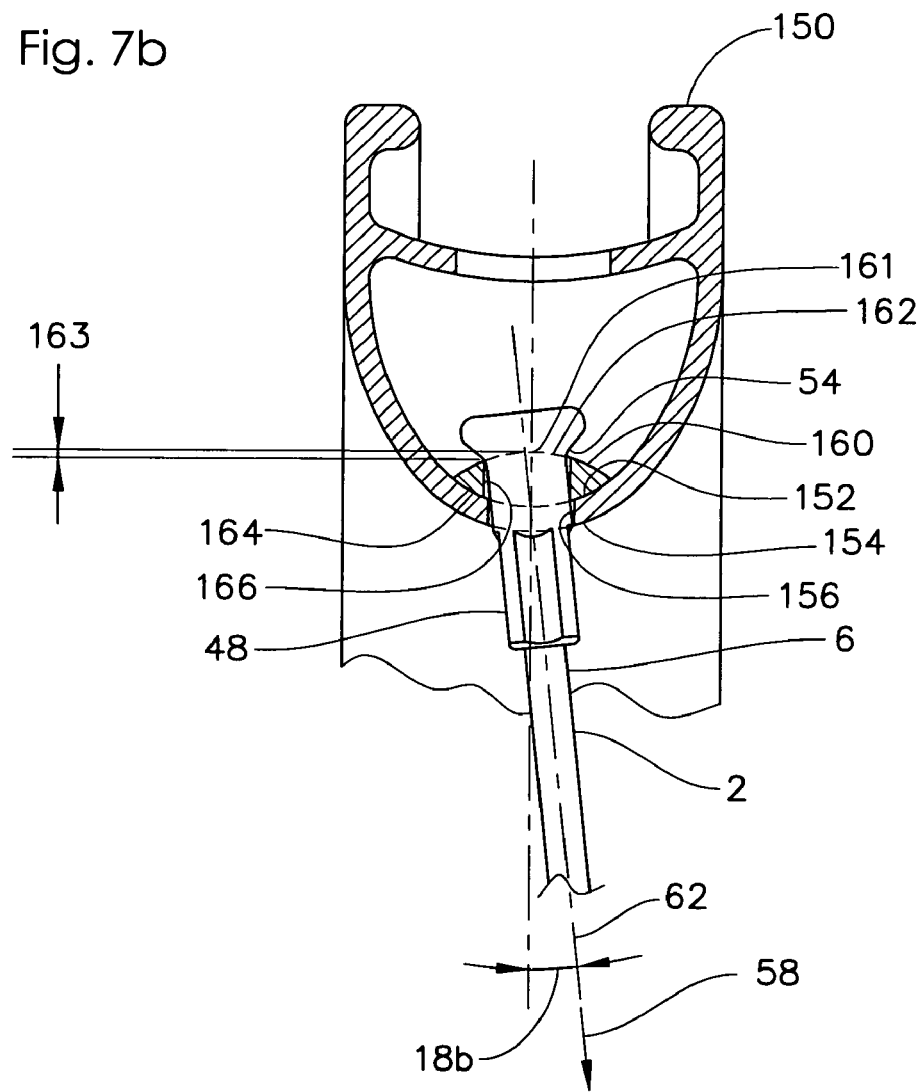
FIG. 7c is a cross-section detail view of the embodiment of FIG. 7b.

Such an insert is described in the embodiment of FIGS. 7*a-c*. Rim 150 is of generally conventional configuration. Spoke bed 154 includes outboard surface 152, which has a concave profile. Spoke bed 154 is of generally constant wall thickness as shown. This is in contrast to the spoke bed of FIGS. 4*a-f*, 5*a-c*, 6*a-c*, which utilize a thickened spoke bed in the region of the apex of the convex outboard surface. The spoke bed 150 is pierced with a plurality of spoke holes 156.

FIG. 7*a* shows the components of the embodiment in exploded view, prior to assembly. Included is insert 160 that serves to provide a localized convex outboard surface at the location surrounding the spoke 2. Insert 160 includes a convex outer surface 162 and a convex inner surface 164 and nipple hole 166 extending through the insert 160 to provide passage for the shank 52 of the spoke nipple 48. Inner surface 164 is a radially-inboard facing convex surface with a generally constant radius of curvature to provide a matched surface with the concave outboard surface 152 of the rim 150. Thus, the nested concave/convex surfaces provide that insert 160 may swivel with respect to the outboard surface 152 to create a self-aligning capability between the insert 160 and the rim 150 as shown in FIG. 7*c*. Convex outboard surface 162 provides the requisite convex profile, including apex 161, whose advantages have been described in the embodiment of FIGS. 4*a-f*.

As shown in FIGS. 7*a-c*, it may be seen that the intersection between the cylindrical nipple hole 166 and the outboard surface 162, creates a saddle-shaped outer edge 168 that functions in a manner similar to outboard edge 98 of FIGS. 4*a-f*. Transition portion 54 of spoke nipple 48 contacts the outer edge 168 of the nipple hole 166 at the circumferentially spaced quadrant points 172*a* and 172*b*, which are adjacent apex 161 and are generally in alignment with the spoke centerline 62. The spoke nipple 48 is thereby braced against the spoke bed 154 via the insert 160 to resist the spoke tension 58 of the spoke 2. Quadrant points 170*a* and 170*b*, which axially straddle the apex 161, are spaced by radial distance 163 to be radially inboard of quadrant points 172*a* and 172*b*, which are at or near the apex 161. Thus, with insert in place as shown in FIG. 7*c*, the spoke bed 154 effectively includes a radially outboard portion provided by the insert 160 at apex 161 and a radially inboard portions axially spaced on either side of apex 161. With the spoke 2, nipple 48, insert 160, and rim 150 assembled as shown in FIGS. 7b-c, it may be seen that a localized convex surface is provided by the insert 160, with beneficial results that are similar to those described in FIGS. 4a-f. Further, insert 160 provides localized reinforcement to the spoke bed 154 at the high-stress region surrounding the spoke hole 156. Insert 160 has a broad surface area of contact with the outboard surface 152 of the spoke bed 154, thereby reducing contact stress in the spoke bed 154 due to spoke tension 58. Thus the spoke bed 154 may be thinner in the regions between the spoke holes 156, thereby beneficially saving material weight.

It should be noted that insert 160 is a generally symmetrical element about a given axial plane. This means that the insert is not "handed" toward a positive or negative angle of inclination and may be assembled with the rim in either orientation. In addition, the nested convex inner surface 164 and concave outboard surface 152 provide a self-centering feature that makes for easy assembly of the insert to the rim.

Figure 8:
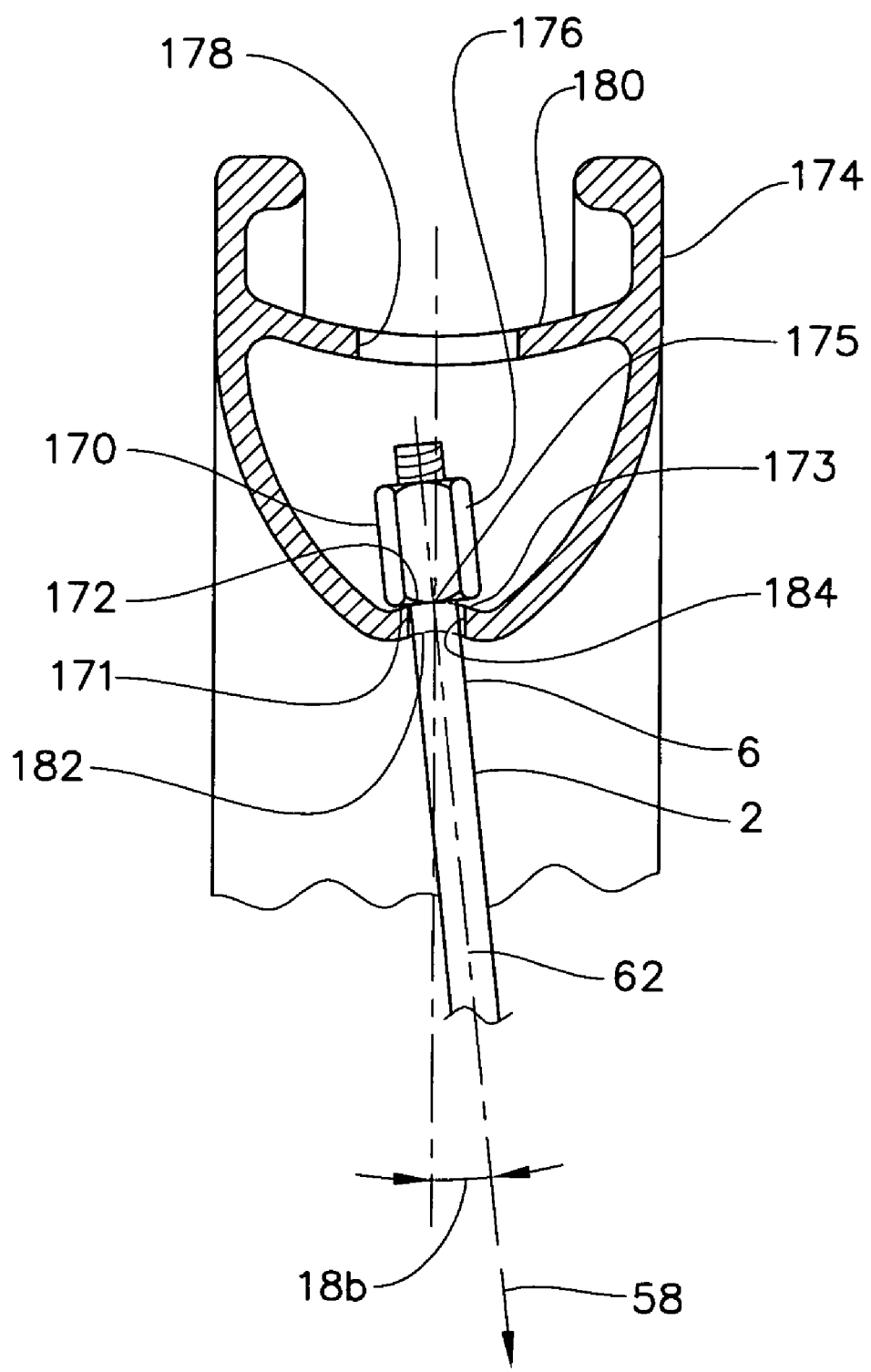
FIG. 8 is a cross-section detail view of a wheel of a fifth embodiment of the present invention.

FIG. 8 describes an embodiment that utilizes a spoke nipple 170 that is of the "internal nipple" variety and does not include a shank that extends through the spoke bed 172 of rim 174. Instead, nipple 170 may be manipulated by a wrench (not shown) that extends through clearance hole 178 in tire bed 180 to engage flats 176. Unlike the conical transition portion 54 of spoke nipple 48 as shown in previous figures, the spoke nipple 170 of FIG. 8 is shown here to have a transition portion 171 that is generally perpendicular to the spoke centerline 62.

Rim 174 includes tire bed 180 and spoke bed 172, which includes an arcuate convex outboard surface 173, including apex 175, similar to that described in FIGS. 4a-f. Spoke hole 184 extends through the spoke bed 172 to accommodate second end 6 of spoke 2. The spoke bed 172 is pierced with a plurality of spoke holes 184 that are sized to provide clearance with spoke 2.

It may be seen that the perpendicular transition portion 171 may have bracing contact with the outboard surface 173 of the spoke bed 172, instead of bracing contact with the outboard edge of the spoke hole 184. Thus, this surface-to-surface contact may have greater contact area than surface-to-edge contact, thereby reducing the contact stress due to spoke tension 58 loads and reducing any galling or deformation due to excessive contact stresses.

It should be noted that the spoke bed 172 is of generally constant wall thickness as shown, with a concave inboard surface 182. The constant spoke bed wall thickness allows for a generally thinner wall, thereby saving material weight. This is in contrast to the spoke bed of FIGS. 4a-f, 5a-c, 6a-c, which utilize a thickened spoke bed in the region of the apex of the convex outboard surface. Since the spoke hole 184 is generally drilled to be true radial (without an angle of inclination) and the spoke 2 has an angle of inclination 18b, the spoke hole 184 diameter must be larger than the spoke to provide the requisite clearance to accommodate the off-angle of the spoke. By utilizing a thinner spoke bed wall, the clearance required to accommodate this off-angle may be reduced and thus the spoke hole 184 diameter may be reduced. Since less rim material is removed with a smaller spoke hole, the associated weakening of the rim due to spoke hole drilling may be reduced. It should also be noted that the concave inboard surface described in FIG. 8 may also be utilized in conjunction with the embodiments of FIGS. 4a-c, 5a-c, 6a-c, 7a-d, and 9.

The embodiments described thus far show a spoke hole that is drilled with a true radial centerline. In other words, the spoke hole in the rim is aligned to be perfectly radial and is not drilled at an angle to follow the inclination angle 18a or 18b. If the inclination angle is not very large, it is often easiest to drill the spoke hole oversized so that there is sufficient clearance between the shank of the nipple and the inside diameter of the spoke hole to permit angular misalignment (off-angle) between the centerline of the spoke and the centerline of the spoke hole. This clearance allows the nipple to tilt or self-align within the spoke hole to generally follow the desired angle of inclination. However, it may desirable to drill the spoke hole at an angle that generally follows the inclination angle of the spoke. Such angled spoke hole drilling allows for a reduced spoke hole diameter and is also more effective at aligning the nipple with the inclination angle of the spoke.

Figure 9:
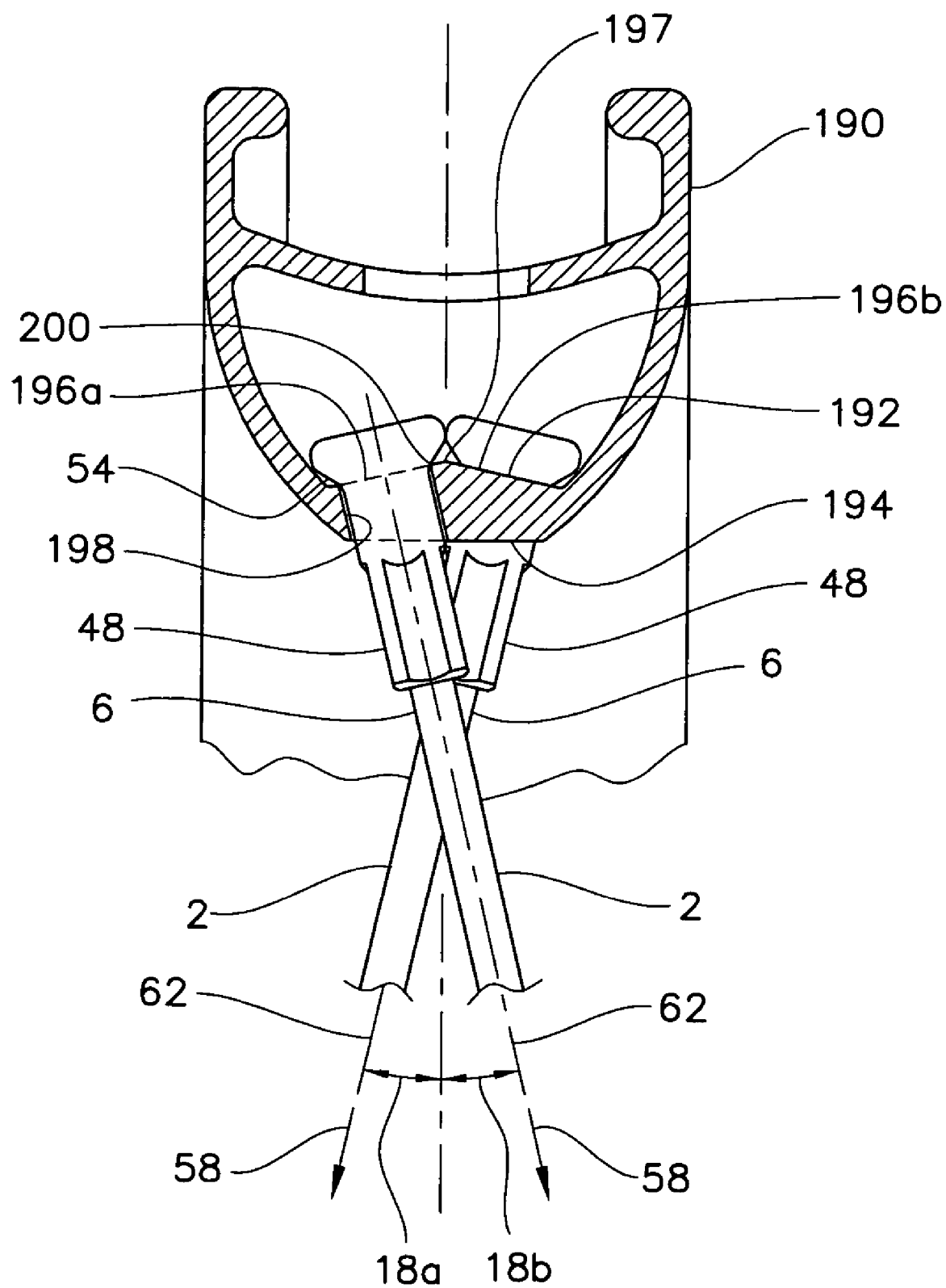
FIG. 9 is a cross-section detail view of a wheel of a sixth embodiment of the present invention.

FIG. 9 describes an embodiment that utilizes angled spoke hole drilling to align the spoke nipple with the inclination angle of the spoke. The spoke bed 194 of rim 190 includes an inverted "V"-shaped or peaked convex outboard surface 192 with inclined flanks 196a and 196b and peaked apex 197. Flank 196a is preferably inclined to be generally perpendicular to the spoke centerline 62 with angle of inclination 18b. Radially outboard apex 197 is located at the intersection of flanks 196a and 196b, which slope in a radially inwardly direction. Spoke hole 198 is drilled to be generally collinear with the spoke centerline 62, with angle of inclination 18b, and is aligned to pierce flank 196a. Thus, flank 196a creates a generally orthogonal surface relative to the spoke centerline 62 such that the transition portion 54 of the spoke nipple 48 has square outboard edge 200 to bear against. Thus, the transition portion 54 of the spoke nipple 48 may contact the outboard edge 200 continuously around its entire perimeter, thereby increasing the contact area and reducing the contact stress due to bracing against spoke tension 58. It is also understood that a second spoke hole (not shown) with an inclination angle 18a may be aligned to pierce flank 196b in a similar manner.

It should be noted that, in comparison with the embodiment of FIGS. 5a-c, the spoke hole 198 does not intersect the apex 197. In fact, the spoke hole 198 pierces the outboard surface 192 such that outboard edge 200 is entirely axially offset to one side of the apex 197.

While my above description contains many specificities, these should not be construed as limitations on the scope of the invention, but rather as exemplifications of embodiments thereof. It is to be understood that the invention is not limited to the illustrations described and shown herein, which are deemed to be merely illustrative of the best modes of carrying out the invention, and which are susceptible of modification of form, size, arrangement of parts and details of operation. For example:

The spoke holes may be drilled on an angle to follow the span of the spoke, rather than being perfectly (true) radial.

The spoke holes may be axially offset, rather than being axially centered on the rim. Further, the spoke holes may be drilled such that the centerline of the spoke hole is axially offset from the apex of the convex outboard surface.

The spoke nipple may have a wide variety of forms that will provide an overlie bracing engagement with the rim. The corresponding transition portions may include any of a variety of forms, including flat, conical, spherical, tapered, etc. Further, the nipple may be eliminated altogether, in favor of a headed spoke, with the head providing the aforementioned overlie engagement. Further, it is envisioned that the nipple may have a transition surface that is generally perpendicular to the spoke centerline. In this case, it is possible that the bracing contact may be between the transition portion and the outboard surface of the spoke bed. This surface-to-surface contact also has the added benefit of providing a greater contact area than the aforementioned surface-to-edge contact.

The spoke nipple may have a bracing overlie engagement with the outboard surface of the spoke bed or it may have a bracing overlie engagement with the outboard edge of the spoke hole or some combination of the two.

While the embodiments described herein show a spoke nipple as having a bracing overlie engagement with the spoke bed of the rim, it is understood that this is merely the conventional arrangement. In this case, the spoke nipple serves as a representation of an intermediate connecting element between the spoke and the rim. However, it is also envisioned that the spoke may be directly engaged with the rim. For example, the spoke may include a headed portion formed directly in the spoke. This headed portion may function in a manner similar to the head of the nipple to provide overlie engagement with the spoke hole.

The rim cross section of the rim in the embodiments is shown to be of a conventional "double-wall" configuration. This is merely to provide context and the present invention may be easily adapted to rims of "single-wall" or other types of rim configurations.

It has been discussed that one method to produce a rim of the present in invention is an extrusion process where the straight extrusion profile is subsequently rolled into a circular rim hoop. It is most common to extrude bicycle rims out of aluminum material, which is lightweight and well adapted to bicycle wheel application. However, it should also be understood that a wide range of alternative materials may be utilized, including magnesium, titanium, steel and composites, among others. While some of these materials may be extruded there is also a wide range of alternative fabrication processes that may be employed, including pultrusion, molding, casting, forging, among others.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel, comprising:
   an outer rim;
   a central hub with a central axle and an outer flange;
   a plurality of spokes extending between the rim and hub, wherein said spokes have a first portion connected to said rim and a second portion opposed to said first portion and connected to said hub; and
   wherein said outer rim includes a spoke bed wall with a spoke hole therethrough for connection with said first end of said spoke;
   wherein said spoke bed wall has a radially outboard surface;
   wherein said outboard surface includes a convex outboard surface portion defined by a radially outboard apex region and radially inwardly sloping sides extending from either side of said apex region;
   including an outboard edge created by the intersection of said spoke hole and said convex outboard surface portion;
   wherein said outboard edge includes a first axially spaced quadrant point, a second axially spaced quadrant point, a first circumferentially spaced quadrant point, and second circumferentially spaced quadrant point;
   wherein said first axially spaced quadrant point is radially inboard of at least one of said first and second circumferentially spaced quadrant points;
   wherein said first portion of said spoke includes an overlying engagement with at least one of said outboard edge and said outboard surface; and
   wherein said overlying engagement provides resistance to spoke tension forces.

2. A wheel according to claim 1, including a second element connected to said spoke, wherein said overlying engagement is between said second element and said outboard surface.

3. A wheel according to claim 2, wherein said second element is a spoke nipple, wherein said overlying engagement is between said between said spoke nipple and said outboard surface.

4. A wheel according to claim 3, wherein said spoke nipple includes an enlarged head portion and a shank portion, wherein said shank portion extends within said spoke hole.

5. A wheel according to claim 1, wherein a first set of spokes connected to said rim is anchored to a first anchoring portion of the hub and a second set of spokes connected to said rim is anchored to a second anchoring portion of the hub axially spaced from the first anchoring portion, wherein said first set of spokes have a first angle of inclination with respect to the axial centerline plane of the rim and wherein said second set of spokes have a second angle of inclination with respect to the axial centerline plane of the rim.

6. A wheel according to claim 1, wherein said spoke hole is a radially extending spoke hole with a radially extending spoke hole centerline.

7. A wheel according to claim 5, wherein said spoke hole is an angled spoke hole, whose spoke hole centerline has an axial angle of inclination.

8. A wheel according to claim 7, wherein said angle of inclination of said spoke hole centerline is generally collinear with one of said first angle of inclination and said second angle of inclination of said spoke.

9. A wheel according to claim 1, wherein the centerline of said spoke hole is generally centered on said apex region.

10. A wheel according to claim 1, wherein said spoke hole intersects said apex region.

11. A wheel according to claim 1, wherein the centerline of said spoke hole is axially offset from said apex region.

12. A wheel according to claim 1, wherein said convex outboard surface portion is a circumferentially extending convex outboard surface portion.

13. A wheel according to claim 12, wherein said spoke bed wall has a cross-sectional profile that is generally constant around the full circumference of the outer rim.

14. A wheel according to claim 1, wherein said convex outboard surface portion is symmetrical about an axial plane at the centerline of said spoke hole.

15. A wheel according to claim 1, wherein said convex outboard surface portion is asymmetrical about an axial plane at the centerline of said spoke hole.

16. A wheel according to claim 1, wherein said convex outboard surface portion is circumferentially symmetrical about a radial plane at the centerline of said spoke hole.

17. A wheel according to claim 1, wherein said convex outboard surface portion is circumferentially asymmetrical about a radial plane at the centerline of said spoke hole.

18. A wheel according to claim 1, wherein said convex outboard surface portion is an arcuate convex outboard surface portion.

19. A wheel according to claim 1, wherein said convex outboard surface portion is a peaked convex outboard surface portion.

20. A wheel according to claim 1, wherein said convex outboard surface portion includes a radially outwardly extending rib portion, wherein said apex region is located in said rib portion.

21. A wheel according to claim 1, wherein the first end of said spoke includes an enlarged head portion and a reduced shank portion, with a transition portion between said enlarged head portion and said reduced shank portion, and wherein said overlying engagement is between at least a portion of said outboard edge and said transition portion.

22. A wheel according to claim 21, wherein said transition portion is a tapered transition portion.

23. A wheel according to claim 1, wherein said outboard edge is a generally saddle-shaped outboard edge.

24. A wheel according to claim 1, wherein said convex outboard surface portion is located in a second element connected to said outer rim.

25. A wheel according to claim 24, wherein said second element includes an overlying engagement with said spoke bed wall.

26. A wheel according to claim 1, wherein said convex outboard surface portion of said spoke bed wall is integral with said outer rim.

27. A wheel according to claim 1, wherein said spoke hole has a centerline and said spoke has a centerline that is non-collinear with said spoke hole centerline and wherein said centerline of said spoke crosses over said centerline of said spoke hole at a crossover point as viewed in the rim profile view, and wherein said crossover point is located to be radially inboard from said outboard surface.

28. A wheel according to claim 1, wherein said outer rim is a double-wall rim, including said spoke bed wall, a tire bed wall and a pair of axially spaced sidewalls extending between the spoke bed wall and the tire bed wall.

29. A wheel according to claim 1, wherein said convex outboard surface portion is convex as viewed in the radial plane cross-section.

30. A wheel according to claim 1, wherein said outboard edge is a generally inclined outboard edge, wherein said second axially spaced quadrant point is radially outboard of said first circumferentially spaced quadrant point.

31. A wheel according to claim 1, wherein said second axially spaced quadrant points is radially inboard of said first circumferentially spaced quadrant point, with said first axially spaced quadrant point and said second axially spaced quadrant point straddling said apex region.

32. A wheel according to claim 31, wherein said first circumferentially spaced quadrant point is axially aligned with said apex region.

33. A wheel according to claim 1, wherein said spoke bed wall has non-constant cross-sectional thickness, wherein said apex region defines a thickened region of said spoke bed wall.

34. A wheel according to claim 31, wherein said spoke bed wall has a radially inboard surface and wherein said radially inboard surface is one of flat and convex in a region corresponding to said apex region.

35. A wheel according to claim 1, wherein said spoke bed wall has generally constant cross-sectional thickness in the region adjacent said apex region.

36. A wheel according to claim 1, wherein said spoke bed wall has a radially inboard surface and wherein said radially inboard surface is concave in a region corresponding to said apex region.

37. A wheel according to claim 1, wherein said spoke hole is axially offset from said apex region, with both said first axially spaced quadrant point and said second axially spaced quadrant point axially located to be on one side of said apex region.

38. A wheel according to claim 5, wherein at least one of said sloping sides has an angle of inclination, and wherein said spoke has an angle of inclination and wherein said angle of inclination of said spoke is generally perpendicular to said angle of inclination of said sloping side at said overlying engagement.

39. A vehicle wheel, comprising:

an outer rim;

a central hub with a central axle and an outer flange;

a plurality of spokes extending between the rim and hub, wherein said spokes have a first portion connected to said rim and a second portion opposed to said first portion and connected to said hub; and wherein said outer rim includes a spoke bed wall with a spoke hole therethrough for connection with said first end of said spoke;

wherein said spoke bed wall has a radially outboard surface;

wherein said outboard surface is a convex outboard surface including a radially outboard apex region and a radially inboard portion relative to said apex region and adjacent axially disposed from said apex region; and wherein said spoke hole has a centerline and said spoke has a centerline that is non-collinear with said spoke hole centerline and wherein said centerline of said spoke crosses over said centerline of said spoke hole at a crossover point as viewed in the rim profile view, and wherein said crossover point is located to be radially inboard from said outboard surface.

* * * * *